United States Patent Office 3,511,657
Patented May 12, 1970

3,511,657
METHOD OF STRIPPING GELATIN EMULSIONS FROM POLYESTER SUPPORTS
Edward A. Smith, Rochester, N.Y., assignor to Eastman Kodak Company, Rochester, N.Y., a corporation of New Jersey
No Drawing. Filed May 10, 1967, Ser. No. 637,343
Int. Cl. G03c 5/26
U.S. Cl. 96—50                         11 Claims

ABSTRACT OF THE DISCLOSURE

Gelatin emulsion layers are stripped from temporary supports composed of a polyester material by treatment with 1,4-dioxane, 1,3-dioxolane or cyclohexanone. The employment of these solvents permits the stripping of photosensitive gelatin-silver halide emulsion layers from a polyester support without the need for a special stripping layer. In addition, the utilization of these solvents permits the stripping of a temporary support from the emulsion in a semi-dry state for transfer to a second support.

---

This invention relates to stripping gelatin coatings from supports. In one embodiment, it relates to stripping photographic gelatin emulsions from polyester supports.

Many applications of photographic materials require a photographic stripping material in which an emulsion layer is carried by a temporary support and is transferred from the original support to a new support. These so-called "stripping films" are well known in the art for both wet and dry stripping and are employed for gravure resist and photo-stencil films.

Ordinarily, photographic stripping film comprises a temporary support, a light-sensitive emulsion, and a stripping layer interposed between the temporary support and the photosensitive emulsion. After exposure of the photographic film and processing thereof, the temporary support is removed from the photosensitive emulsion by stripping therefrom. The stripping layer facilitates the removal of the temporary support. The stripping layers are specially designed layers having low adhesive characteristics for the easy removal of the temporary support from the photographic emulsion. In addition, these layers have particular solution characteristics which permit their removal from an emulsion layer after the temporary support is peeled away.

Most photographic elements do not employ such separate stripping layers. However, without such layers the task of removing the original support material after the photosensitive gelatin emulsion has been attached to a second support is arduous and time consuming. In the production of composite color pictures, such as in advertising displays, it has been attempted to dissolve off the temporary support material employing various solvents. For example, acetate base materials have been dissolved by means of methyl ethyl ketone, acetone, etc., but this is a messy and highly undesirable process. Furthermore, such solvents are wholly ineffective for dissolving off polyester support materials, which materials have highly desirable properties for stripping film usage, including a high degree of dimensional stability.

In accordance with this invention, original supports comprising a high molecular weight linear polyester may be easily stripped from gelatin-containing emulsion layers without the need for a separate stripping layer. It has now been found that gelatin emulsion layers may be easily stripped from polyester support materials by treatment with either 1,4-dioxane, 1,3-dioxolane or cyclohexanone. By contacting the photographic film comprising the polyester support and the swollen gelatin emulsion with the solvents or mixtures of the solvents of this invention, the original support material may be easily removed from the emulsion layer while the latter is in a dry or semi-dry state without the necessity of employing solvents for dissolving the support material.

Preferably, the photographic film is treated with water prior to the solvent treatment. This permits an improved contact by the solvent, since the gelatin emulsion layer will swell and permit penetration of the solvent to the support.

The process of this invention is applicable to the removal of processed or raw gelatin emulsions and each can be easily stripped from a polyester support by the method of this invention. In addition, the process of this invention can be employed for the removal of matte pelloids from high quality films. The removal of such surfaces will increase the apparent sharpness of the photographic image. The process of the invention can also be employed for removal of antihalation layers to reduce minimum density.

The original support that may be treated with the process of this invention comprises a film base material having a high degree of dimensional stability and impervious to the dioxane and dioxalane solvents. Suitable support materials include high molecular weight linear polyesters prepared by condensing a dihydric alcohol with a dibasic saturated fatty carboxylic acid or derivatives thereof.

Suitable dihydric alcohols include glycols wherein the hydroxyl groups are on the terminal carbon atoms and contain from 2 to 12 carbon atoms. Specific examples of dihydric alcohols include ethylene glycol, propylene glycol, trimethylene glycol, hexamethylene glycol, decamethylene glycol, dodecamethylene glycol and 1,4-cyclohexane dimethanol.

Suitable dibasic acids include adipic acid, sebacic acid, decanedioic acid, hexadecanedioic acid, phthalate acid, and terephthalate acid. The alkyl esters of the above acids can also be employed. A particularly suitable high molecular weight linear polyester is polyethylene terephthalate. Conventionally, the temporary support may have a thickness on the order of about 0.005 to about 0.15 inch.

The film support may be provided with a suitable subbing layer, such as a layer of a terpolymer system comprising vinylidene chloride, methylmethacrylate and itaconic acid, and the like. Such layers have been described in U.S. Pat. 3,143,421 and British Pat. 1,039,935. Such layers enhance the adhesion between the support and the gelatin emulsion layer. The subbing layer usually has a thickness on the order of about 0.0002 inch.

In addition to the subbing layer, a surface of the polyester support may be bombarded with electrons according to the method described in U.S. Pat. 3,220,842 to Carroll et al. This treatment additionally increases adhesion of the gelatin emulsion layer to the support.

The photographic film that may be treated by the process of this invention may include a gelatin-containing antihalation layer interposed between the temporary support and the gelatin emulsion or a separate layer on the side opposite the light sensitive emulsion. The antihalation layer may contain Carey Lea silver, manganese dioxide or an antihalation dye such as one of the following:

(1) Congo red;

(2) The product which results when 2-naphthylamine-6,8-disulfonic acid is diazotized and coupled with an equimolar amount of chromotopic acid; and (3) The product (Schultz No. 208) which results when 1-naphthylamine-4-sulfonic acid is diazotized and coupled with an equimolar amount of 1-naphthol-4-sulfonic acid.

Conventionally, the antihalation layers are applied at a coverage of about 0.7 to about 0.8 gram per square foot, dry weight.

When the gelatin emulsion layer to be separated from the polyester support is a photosensitive emulsion layer, such as in the case of gravure resist film, such layers generally comprise a silver halide and unhardened gelatin without any hardeners therein. For other purposes such as making composite color pictures the emulsion may be hardened, of course. Such photosensitive emulsions may comprise silver bromoiodide, silver bromide, silver iodide, silver chloride or mixed silver halides such as chlorobromide. Gravure resist film requires that the emulsion be in an unhardened condition, since in use of the element the gelatin of the silver halide emulsion is differentially hardened in the processing bath so that a tanned image is formed in the emulsion layer. The emulsion may contain a developing agent such as a tanning silver halide developer known in the art and/or a non-tanning silver halide developer. Hardening of the gelatin in the emulsion layer would interfere with the use of the photographic element for this purpose.

For use as a stencil, the emulsion may also contain a matting material, such as starch grains, diatomaceous earth, ground glass, barium sulfate or the like. The addition of this material enables the emulsion layer to take pencil lines after exposure and development; thus permitting additives to be made through the drawings.

An anti-curl layer may be employed as a backing for the original polyester support. This layer prevents the curling of the polyester support due to the gelatin emulsion on the oposite side thereof. Suitably, the anti-curl layer may be a conventional gelatin pelloid containing either dyes or manganese dioxide. Other suitable anti-curl layers include a nitrocellulose lacquer, an alkyd resin coating or a lacquer containing both nitrocellulose and alkyd resin. These coatings may be applied from a suitable solvent.

The layers of the photographic film are applied by one of the well known techniques such as hopper, scraper, bead coating, transfer by immersed rollers or any of the procedures well known in the art for the application of layers in preparing photographic products.

Any suitable process may be employed for contacting the 1,4-dioxane, cyclohexanone or the 1,4-dioxolane with the stripping film. While it is preferred to dip the stripping film into the solvent, any suitable method of application may be employed. Thus, the stripping film containing the gelatin emulsion may be sprayed with the solvent. Solvent may be applied in a thin layer by a bead application from a coating wheel, by means of a porous block, etc.

In general, the photographic film should be contacted with the solvent for a time sufficient for the solvent to penetrate through the emulsion to the support. Suitable contact times include from about 15 seconds to about 5 minutes if the emulsion is swollen. When the photographic film is swollen and dipped into the solvent, a time period of about one minute has been found to be suitable.

The solvent may be contacted with the photographic film at a temperature in the range of between about 50° F. and about 150° F. preferably from between about 70–80° F.

As previously mentioned, it is desirable in some instances to contact the photographic film with water prior to the solvent treatment, as this water treatment causes the gelatin to swell and permits better penetration of the solvent to the support. The water treatment may suitably be conducted at a temperature of about 60° F. to about 80° F. for a period of time from about 1 minute to about 10 minutes.

In the case of gravure resist stripping film, the film is exposed, developed, fixed, washed and dried, which procedure differentially effects the gelatin of the emulsion layer imparting a hardening and insolubilizing effect to the gelatin around the silver grains of the image. A suitable method for processing the gravure resist stripping film is disclosed in U.S. Pat. 3,148,063 to Yackel et al.

The gravure resist film is then treated with the solvent of this invention, e.g., by dipping the processed film into a bath of the solvent or solvent mixture. Next, the film is applied to the moist surface of a gravure cylinder with the emulsion surface being in contact with the copper cylinder. The original support may then be easily stripped from the photosensitive gelatin emulsion layer and the non-tanned gelatin may be simply water washed away from the resist with warm water.

The employment of the solvent treatment process of this invention obviates the need for a stripping layer and also obviates the need for removal of the separate stripping support from the photosensitive emulsion after wet transfer and stripping of the gravure film to the cylinder.

An etched surface is formed on the copper cylinder by a conventional manner, such as by employing a ferric chloride etching solution. The copper surface of the gravure cylinder is differentially etched inversely to the thickness and hardness of the gelatin which resides on the surface of the copper. The resulting relief images are thus adapted for use in photogravure printing operations.

The invention will be illustrated by the following examples, but it is to be understood that the invention is not restricted thereto. The percentages are by weight unless otherwise specified.

EXAMPLE 1

A 70 mm. strip of processed negative black-and-white photographic film, having a polyethylene terephthalate support subbed with a terpolymer comprising vinylidene chloride, methyl methacrylate and itaconic acid is immersed in 1,4-dioxane at a temperature of 70° F. for approximately one minute, while the film is still wet with water. The film is then removed and "squeegeed" with the emulsion side down on a copper surface.

A separation of the film support from the photosensitive emulsion is begun at one corner of the film and the polyester base is carefully pulled from the emulsion. This simple operation completely transfers the processed image to the copper without destriction of the emulsion.

EXAMPLE 2

Additional samples of the film of Example 1 are immersed in dioxane according to the procedure of Example 1. However, the film strips are not transferred to an auxiliary support, i.e., copper, but the support is easily stripped from the emulsion layer without the destruction of the emulsion layer.

EXAMPLE 3

Following the procedure of Example 1 a strip of an incorporated coupler reversal color film, having a support similar to Example 1, is immersed in dioxane and transferred to a glass plate by peeling away the original polyester support.

The transfer of the gelatin emulsion to the glass plate is without destruction or fading of the color image.

EXAMPLE 4

The processed black-and-white films of Example 1, as well as raw strips thereof, are soaked in water for one minute at a temperature of 158° F. to swell the emulsion coatings and permit penetration of the solvent to the supports. The treated film strips are then placed in a bath of 1,3-dioxolane for about one minute. Next, the film strips are placed with their emulsion side down onto a glass substrate and pressed lightly to provide intimate contact between the emulsion layers and the glass support.

The film support layer is carefully stripped off and no destruction of the image or the unprocessed emulsion layers results. When the layers are dried they may be easily removed from the glass support intact. Similar results are obtained using cyclohexanone.

EXAMPLE 5

The procedure of Example 4 is repeated employing processed and raw strips of the color film of Example 3 and mixtures of the solvents of this invention.

Similar results are obtained and the transfer of the color emulsions to the glass plate are made without destruction of the emulsions or fading of the color image. Likewise the color emulsion layers are easily removed from the glass support when dried.

EXAMPLE 6

An alternative procedure to the wet stripping of the emulsion layer also produces satisfactory results. This process includes drying of the solvent-treated swollen emulsion layer before stripping. This procedure makes for easier handling of the stripped dry layer which has more rigidity and strength than it does in the swollen condition. A processed piece of photographic film as described in Example 1 is washed in water for five minutes and then soaked in dioxane for one minute. The excess liquid is squeegeed from the surface of the sample and dried in a hot-air oven, for about one minute at 212° F. Times up to half hour may also be used. The emulsion layer is stripped from the support directly on removal of the film sample from the oven. Another film sample is permitted to cool to ambient temperature for five minutes before stripping. Still other samples of the same film so dried are stripped after two hours, and others after 24 hours.

EXAMPLE 7

A length of 35 mm. film 12 inches long of the type described in Example 1 is processed and dried. It is then immersed for 12 hours at room temperature in a container of cyclohexanone. After this time the entire image layer can be separated from the original polyester support and transferred intact. This example illustrates the stripping of an emulsion layer in the absence of water.

While the foregoing description was particularly directed towards the treatment of gelatin emulsions which contain photosensitive materials, the process of this invention is equally applicable for the stripping of non-light sensitive layers such as described in U.S. Pat. 3,179,517.

The invention has been described in considerable detail with particular reference to certain preferred embodiments thereof, but it is understood that modifications and variations can be effected within the spirit and scope of the invention as described hereinabove and as defined in the appended claims.

I claim:
1. The method of facilitating the stripping of a gelatin layer from the surface of a dimensionally stable, polyester film support, which comprises contacting the said support with the gelatin layer thereon with a solvent selected from the group consisting of 1,4-dioxane, 1,3-dioxolane and cyclohexanone.
2. The method of claim 1 wherein the solvent is 1,4-dioxane.
3. The method of claim 1 wherein the solvent is cyclohexanone.
4. The method of claim 1 wherein the solvent is 1,3-dioxolane.
5. The method of claim 1 wherein the ease of stripping is increased by treatment of the polyester supported gelatin with water prior to contact with said solvent.
6. The method of claim 1 wherein the polyester is polyethylene terephthalate.
7. The method of claim 1 wherein the gelatin layer is a photosensitive gelatin-silver halide emulsion.
8. The method of claim 1 wherein a gelatin-containing antihalation layer is on the polyester support on the side opposite the gelatin emulsion.
9. The method of claim 1 wherein the solvent is a mixture of at least two solvents.
10. The method of claim 1 wherein the gelatin layer is substantially unhardened.
11. The method of claim 1 wherein the gelatin emulsion is a substantially unhardened photosensitive gelatin-silver halide emulsion containing a silver halide developing agent.

References Cited

UNITED STATES PATENTS 2,992,130   5/1961   Clark et al.

NORMAN G. TORCHIN, Primary Examiner

J. L. GOODROW, Assistant Examiner

U.S. Cl. X.R.

96—48, 83; 260—118; 134—40; 161—227, 406